(12) United States Patent
Spahn et al.

(10) Patent No.: US 10,328,863 B2
(45) Date of Patent: Jun. 25, 2019

(54) DEPLOYABLE STORAGE SYSTEM FOR A TRUCK

(71) Applicant: FORD GLOBAL TECHNOLOGIES, LLC, Dearborn, MI (US)

(72) Inventors: Brian Robert Spahn, Plymouth, MI (US); Pattrick Loew, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 264 days.

(21) Appl. No.: 15/171,290

(22) Filed: Jun. 2, 2016

(65) Prior Publication Data

US 2017/0349108 A1 Dec. 7, 2017

(51) Int. Cl.
| B60R 9/06 | (2006.01) |
| B60R 11/06 | (2006.01) |
| B62D 33/04 | (2006.01) |
| B62D 33/02 | (2006.01) |

(52) U.S. Cl.
CPC .............. B60R 9/06 (2013.01); B60R 11/06 (2013.01); B62D 33/02 (2013.01); B62D 33/042 (2013.01)

(58) Field of Classification Search
CPC .......... B60R 11/06; B60R 9/06; B62D 33/042
USPC .................................. 296/37.6; 224/420–404
See application file for complete search history.

(56) References Cited

U.S. PATENT DOCUMENTS

| 4,676,534 | A | * | 6/1987 | Hix, Jr. | ............... | E05B 67/383 |
| | | | | | | 292/205 |
| 4,936,624 | A | * | 6/1990 | West | ...................... | B60R 11/06 |
| | | | | | | 224/282 |
| 5,303,969 | A | * | 4/1994 | Simnacher | ............ | B60R 11/06 |
| | | | | | | 224/494 |
| 5,615,922 | A | | 4/1997 | Blanchard | | |
| 5,988,473 | A | | 11/1999 | Hagan et al. | | |
| 6,257,640 | B1 | | 7/2001 | Leitner et al. | | |
| 6,626,479 | B1 | | 9/2003 | Skoug | | |
| 7,686,365 | B2 | | 3/2010 | Thelen et al. | | |
| 7,798,540 | B1 | * | 9/2010 | Vitry | ........................ | E05B 5/00 |
| | | | | | | 292/216 |
| 7,942,295 | B1 | * | 5/2011 | Hume | .................... | B60P 3/002 |
| | | | | | | 206/372 |
| 8,075,037 | B2 | | 12/2011 | Mahaffy | | |
| 8,931,819 | B2 | | 1/2015 | Daniel | | |
| 9,156,412 | B1 | * | 10/2015 | Calvert | ..................... | B60P 7/08 |
| 9,481,403 | B1 | * | 11/2016 | Johnson | .............. | B62D 33/023 |

(Continued)

OTHER PUBLICATIONS

"Du-Ha Humpstor Truck Bed Wheel Well Storage—Innovative Exterior Storage/Tool Box/Gun Case for Truck Beds"; PickupSpecialties.com; http://www.pickupspecialties.com/DU-HA/duha_humpster_truck_wheel_well_tool_box.html; printed Mar. 11, 2016; pp. 1-2.

(Continued)

Primary Examiner — Dennis H Pedder
(74) Attorney, Agent, or Firm — Jason Rogers; Vichit Chea; King & Schickli, PLLC

(57) ABSTRACT

A deployable storage system is provided for a truck. That deployable storage system includes a truck bed wall and a storage cabinet that is integrated into the truck bed wall. The storage cabinet is configured to be displaceable between a stowed position held within the truck bed wall and a deployed position extending above the truck bed wall.

18 Claims, 5 Drawing Sheets

(56) References Cited

U.S. PATENT DOCUMENTS

2011/0284602 A1* 11/2011 Lamouroux ............ B60R 11/06
224/402

OTHER PUBLICATIONS

"Pickup Truck Tool Boxes—Make Your Pickup Truck Look Like a Million Bucks", Highway Products, Inc.; http://www.800toolbox.com/saddle/saddle_box.htm: printed Mar. 10, 2016; pp. 1-11.

* cited by examiner

DEPLOYABLE STORAGE SYSTEM FOR A TRUCK

TECHNICAL FIELD

This document relates generally to the motor vehicle equipment field and, more particularly, to a deployable storage system for a truck that provides substantial additional space for organizing and storing various tools and other objects without interfering with the full use of the truck bed.

BACKGROUND

Many individuals utilizing pickup trucks desire to carry a number of tools and other objects. Toward this end, it is known in the art to equip a pickup truck with a tool box which extends across the bed of the pickup truck between the bed sidewalls. While such a tool box provides an excellent storage space for organizing tools and the like, the tool box does interfere with the use of the truck bed.

This document relates to a new and improved deployable storage system for tools and other objects which may be raised from the truck bed wall when it is desired to access those tools or objects and then lowered back into a stowed position in the truck bed wall where it may be sealed from the weather and secured by a lock.

SUMMARY

In accordance with the purposes and benefits described herein, a deployable storage system is provided for a truck. That deployable storage system comprises a truck bed wall and a storage cabinet that is integrated into the truck bed wall. The storage cabinet is configured to be displaceable between a stowed position held in the truck bed wall and a deployed position extending above the truck bed wall.

The deployable storage system may further include at least one lift handle carried on a top wall of the storage cabinet. That lift handle may be connected to a lock mechanism to secure the storage cabinet in the stowed position. More specifically, the lift handle may be configured to be rotatable between a locked position and an unlocked position.

The storage cabinet may include at least one access door. Further, the storage system may include an access door lock to secure the at least one access door in a closed position. Still further, that access door lock may be recessed into the access door so as to not interfere with the raising and lowering of the storage cabinet within the truck bed wall as the storage cabinet is displaced between the stowed position and the deployed position.

In one possible embodiment, the truck bed wall includes a cavity and the storage cabinet is received within that cavity when in the stowed position.

In some embodiments, the deployable storage system further includes a lock to secure the storage cabinet in the deployed position. Still further, in some possible embodiments, the deployable storage system may further include a lift mechanism for biasing the storage cabinet toward the deployed position. That lift mechanism may include a first strut and a second strut.

The storage cabinet may include a first end wall and a second end wall. A first channel may be provided in the first end wall while a second channel may be provided in the second end wall. The first strut is received in the first channel and the second strut is received in the second channel so as to provide a more compact deployable storage system. In some embodiments, the two lift struts are both gas struts.

In the following description, there are shown and described several preferred embodiments of the deployable storage system. As it should be realized, the deployable storage system is capable of other, different embodiments and its several details are capable of modification in various, obvious aspects all without departing from the deployable storage system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the deployable storage system and together with the description serve to explain certain principles thereof. In the drawing figures.

Figure 1:
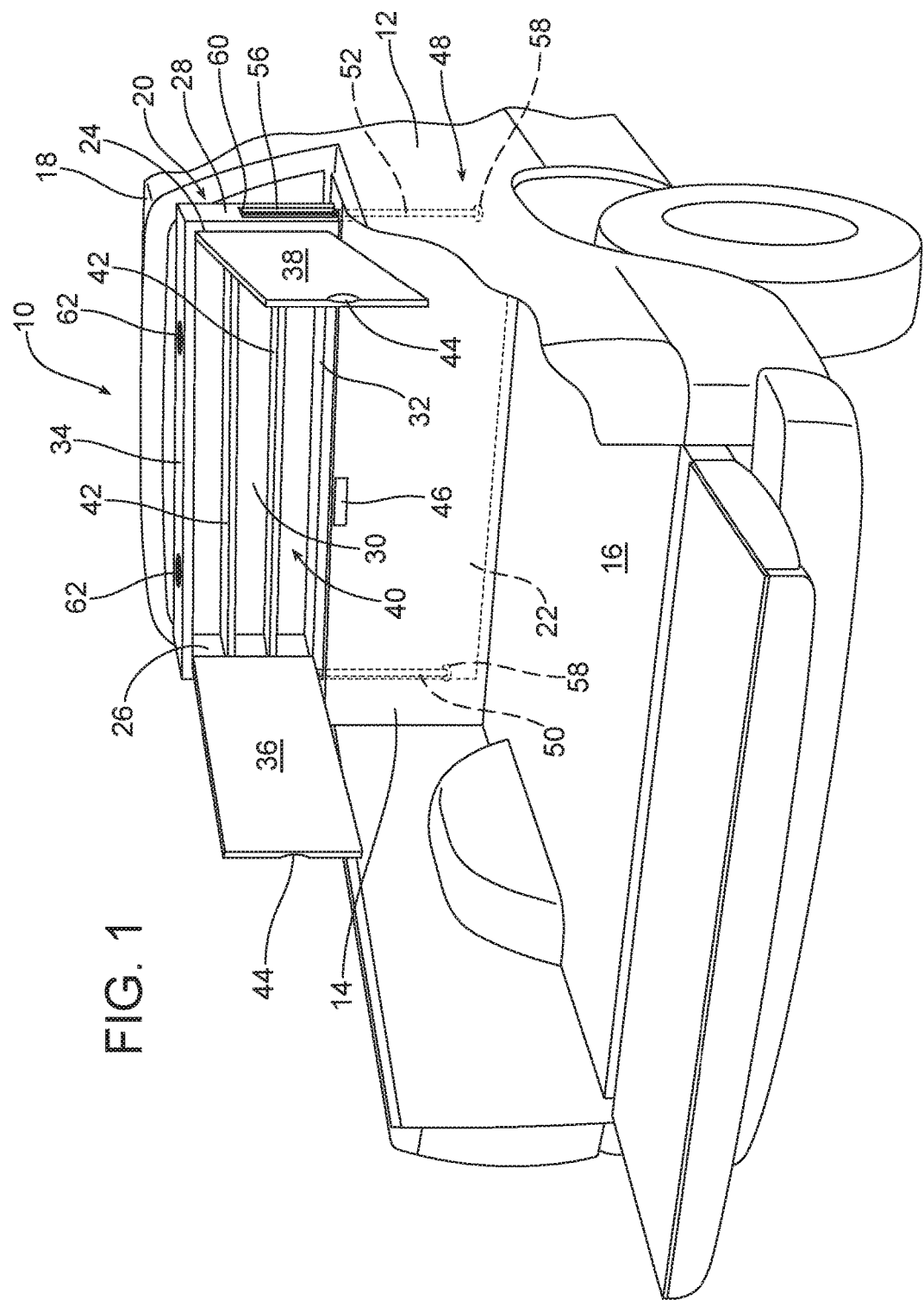
FIG. 1 is a perspective view of the deployable storage system illustrating the storage cabinet thereof in the raised or deployed position. Further, the access door to the storage cabinet is opened in order to show the shelves inside.

Reference will now be made in detail to the present preferred embodiments of the deployable storage system, examples of which are illustrated in the accompanying drawing figures.

DETAILED DESCRIPTION

Reference is now made to FIGS. 1-4b illustrating the deployable storage system 10 provided for a truck such as the illustrated pickup truck 12. In the illustrated embodiment, the pickup truck 12 includes a truck bed wall 14 between the bed 16 and the cab 18 of the pickup truck 12.

Figure 2:
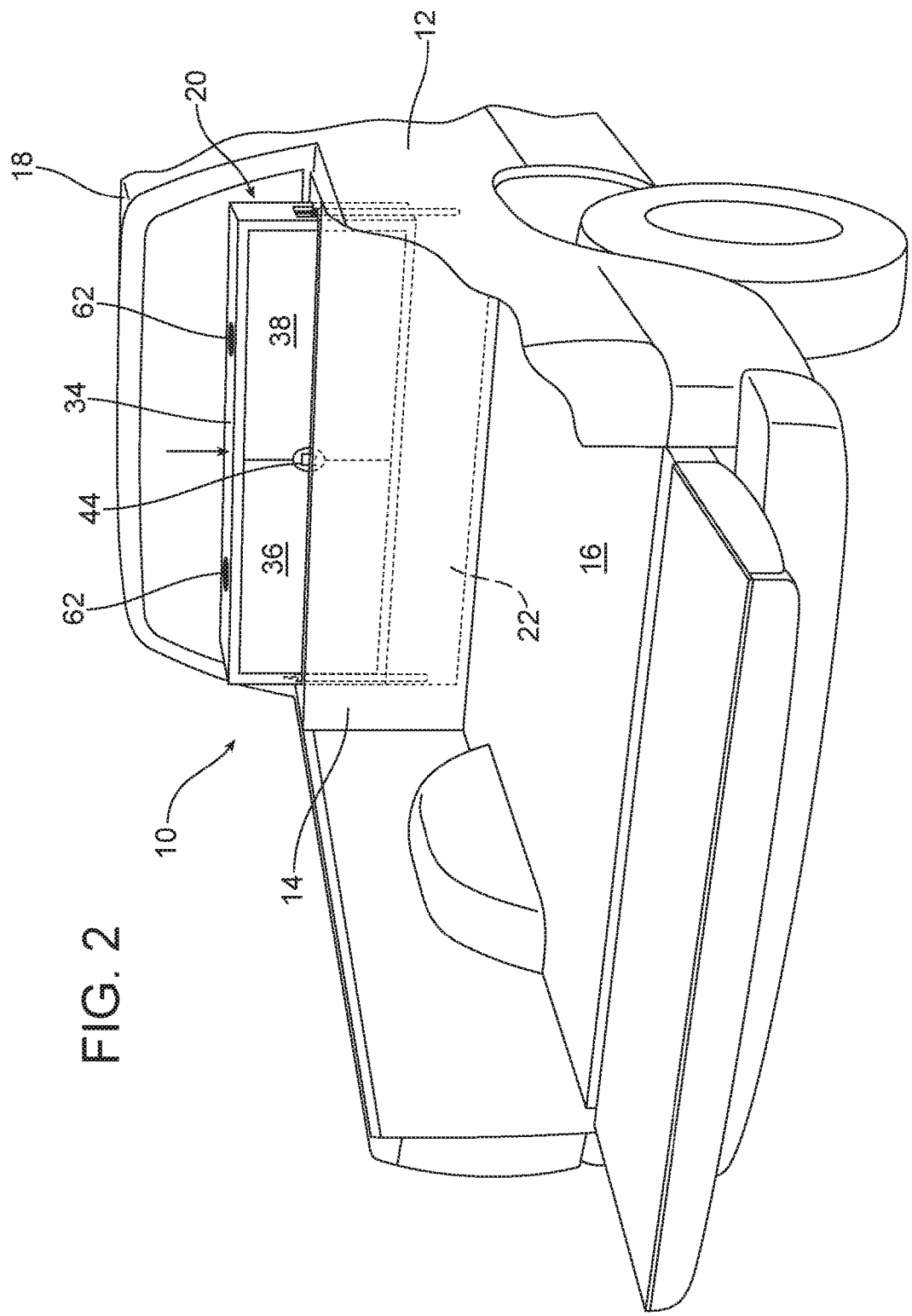
FIG. 2 is a perspective view similar to FIG. 1 wherein the access door of the storage cabinet has been closed and the cabinet has been lowered downward into the truck bed wall toward the stowed position.
Figure 3:
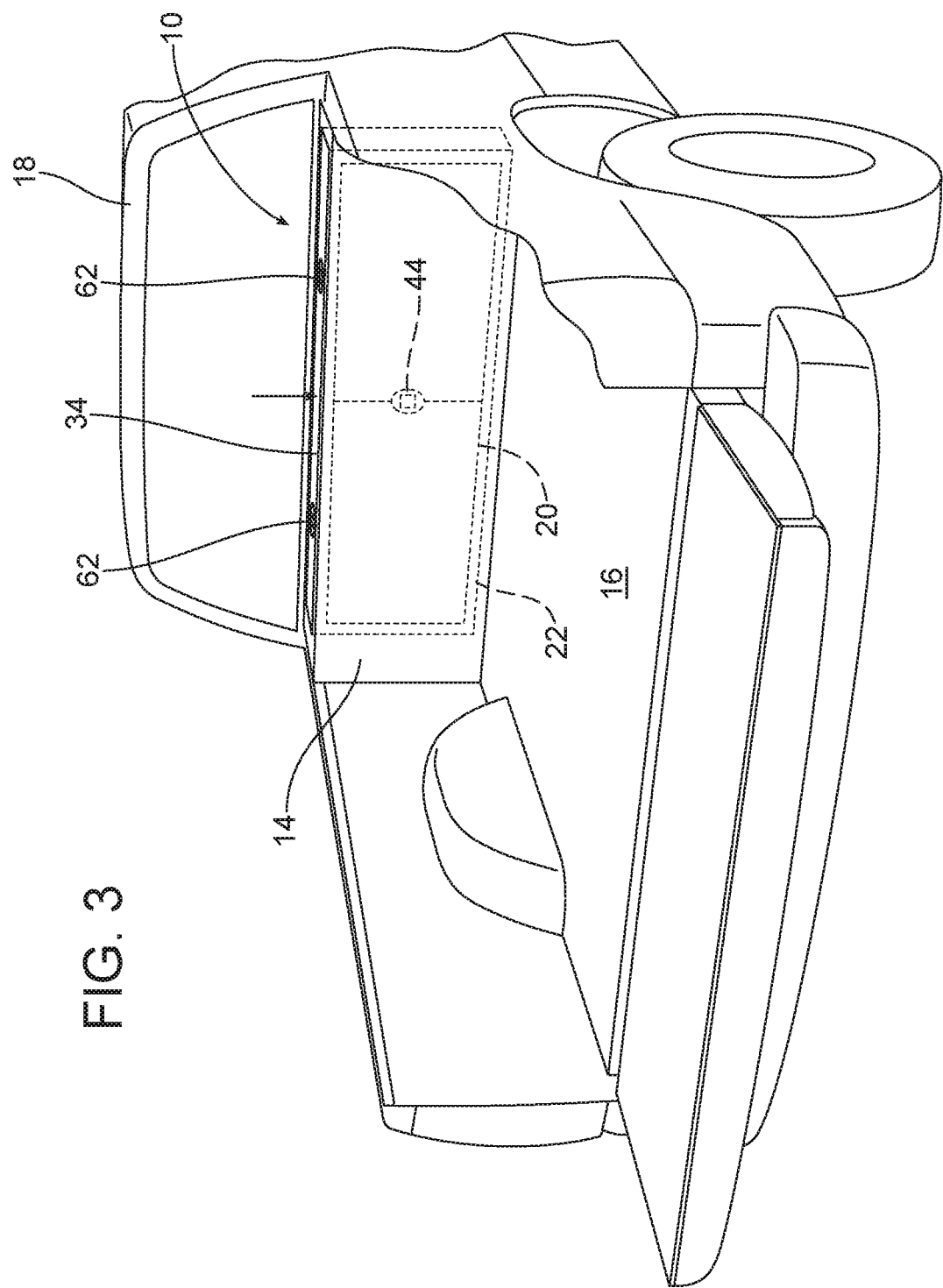
FIG. 3 is a perspective view similar to FIGS. 1 and 2 showing the storage cabinet fully lowered into the storage position with the lift handles in the unlocked position.

As will become apparent from the following description, the deployable storage system 10 also includes a storage cabinet, generally designated by reference numeral 20. The storage cabinet 20 is integrated into the truck bed wall 14 and configured to be displaceable between a deployed position extending above the truck bed wall as illustrated in FIG. 1 and a stowed position held within a cavity 22 of the truck bed wall 14 as illustrated in FIG. 3. FIG. 2 illustrates the storage cabinet 20 in an intermediate position.

As illustrated in FIGS. 1-4, the storage cabinet 20 includes a front wall 24, a first end wall 26, a second end wall 28, a rear wall 30, a bottom wall 32 and a top wall 34. Two access doors 36, 38 are hinged to the front wall 24 and may be opened as illustrated in FIG. 1 to access the storage compartment 40 within the cabinet. That storage compartment 40 may include one or more shelves 42 for storing and organizing tools or other objects. Of course it should be appreciated that the storage compartment 40 may also be equipped with hooks, clips or substantially any other devices to hold tools or other implements as desired. An access door lock 44 may be provided to lock the access doors 36, 38 in the closed position illustrated in FIGS. 2 and 3. As should be appreciated, the access door lock 44 is recessed into the access doors 36, 38 so that the storage cabinet 20 may be raised and lowered into and out of the cavity 22 in the truck bed wall 14 without causing any interference.

As best illustrated in FIG. 1, the deployable storage system 10 may further include a lock mechanism 46 which is schematically illustrated in FIG. 1. That lock mechanism functions to secure the storage cabinet 20 in the raised or deployed position illustrated in FIG. 1 where the access doors 36, 38 may be opened to freely and conveniently access the contents within the storage compartment 40 of the storage cabinet. Here it should be appreciated that the lock mechanism 46 may comprise a manual, mechanical or electronic lock of a type known in the art and suitable for the purpose of securing the storage cabinet 20 in the deployed position.

As further illustrated in FIGS. 1-3, the deployable storage system 10 may include a lift mechanism, generally designated by reference numeral 48, that functions to bias the storage cabinet 20 toward the deployed position. In the illustrated embodiment, the lift mechanism 48 comprises a first strut 50 and a second strut 52. More particularly, the first strut 50 is received in a first channel (not shown) in the first end wall 26 of the storage cabinet 20 while the second strut 52 is received in a second channel 56 in the second end wall 28 of the storage cabinet 20. As shown, the first strut 50 and the second strut 52 are connected at their bases 58 to the truck bed, body or frame of the truck while the second or actuator ends 60 are connected to the storage cabinet 20. In one possible embodiment, the two struts 50, 52 are telescoping gas struts. In other embodiments they could be hydraulic struts or electromechanical struts if desired. In one possible embodiment, the lift mechanism 48 provides enough lifting force to raise the storage cabinet 20 from the stowed position illustrated in FIG. 3 to the deployed position illustrated in FIG. 1. In other embodiments, the lift mechanism 48 provides enough lifting force to counterbalance the weight of the cabinet 20 and aid a user in lifting the cabinet to the deployed position.

In the illustrated embodiment, two lift handles 62 are mounted to the top wall 34 of the storage cabinet 20. One or both lift handles 62 may be connected to a lock mechanism, schematically illustrated at 64, that functions to secure the storage cabinet in the stowed position illustrated in FIG. 3. In such an embodiment the lift handle or lift handles 62 connected to the lock mechanism 64 may be configured to be rotatable between an unlocked position, illustrated in FIG. 4a, and a locked position, illustrated in FIG. 4b.

When one wishes to displace the storage cabinet 20 from the deployed position illustrated in FIG. 1 to the stowed position illustrated in FIG. 3, one first closes and locks the access doors 36, 38 by means of the access door lock 44. Next, one releases the lock mechanism 46 which secures the cabinet 20 in the deployed position. The storage cabinet 20 may then be lowered downwardly as illustrated in FIG. 2 toward the fully stowed position illustrated in FIG. 3 by holding onto and manipulating the lift handle 62.

Once the storage cabinet 20 has been fully lowered into the stowed position illustrated in FIG. 3, one rotates the lift handles 62 into the locked position (note action arrow A in FIG. 4b) causing the latch bolts 66 on the opposed ends of those lift handles to engage with the strike plates 68 secured to the truck bed wall 14 within the cavity 22.

Figure 4A:
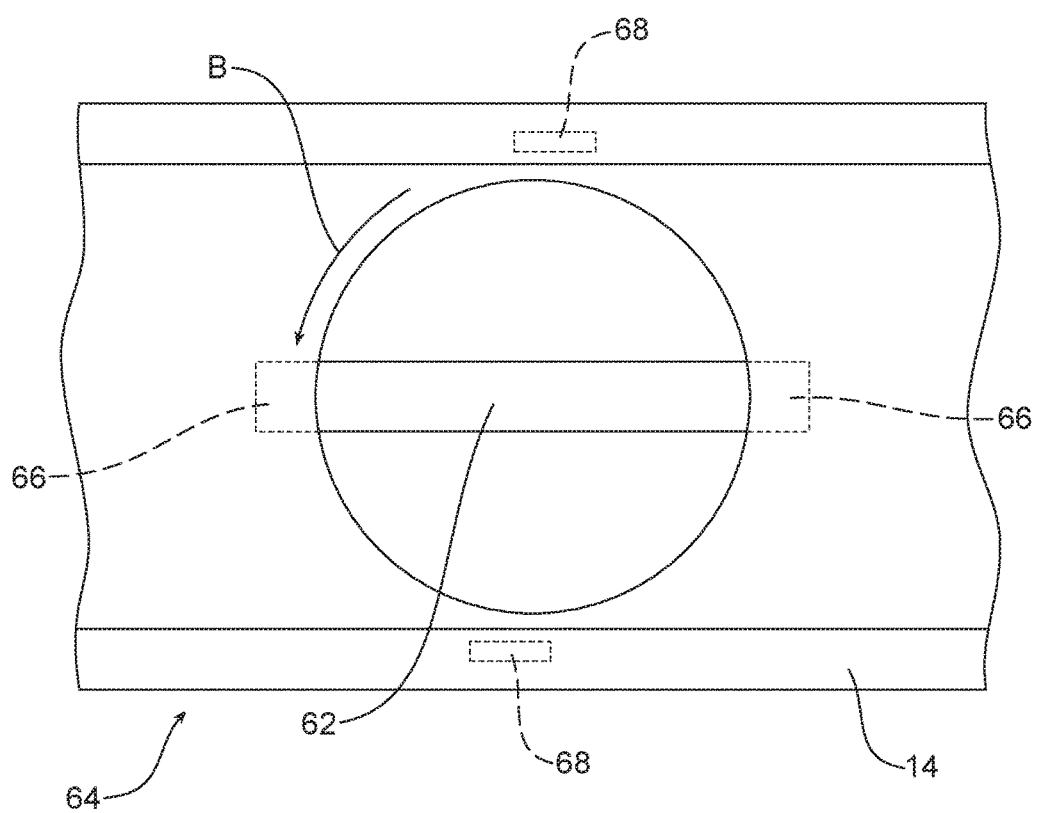
FIG. 4a is a detailed top plan view of one lift handle wherein that lift handle is illustrated in the unlocked position.
Figure 4B:
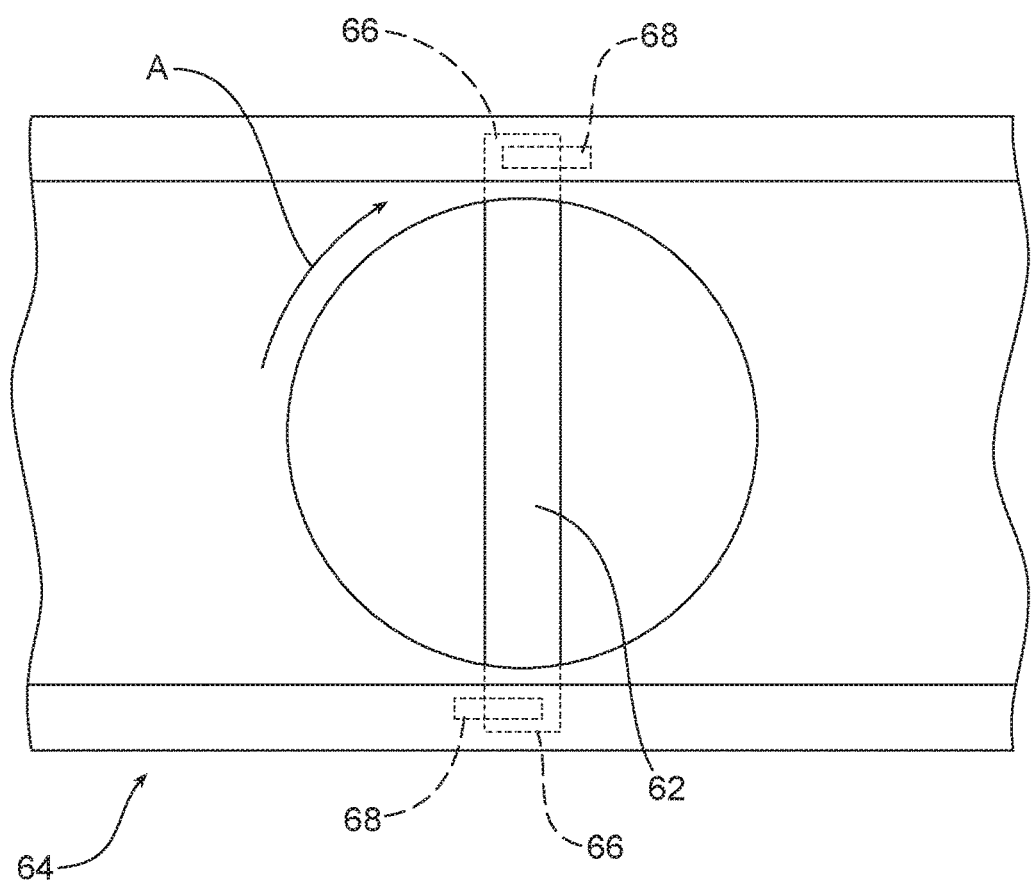
FIG. 4b is a detailed plan view similar to FIG. 4a but showing the lift handle in the locked position.

When one wishes to once again raise the storage cabinet 20 from the stowed position illustrated in FIG. 3 to the fully deployed position illustrated FIG. 1, one first rotates the lift handles 62 from the locked position to the unlocked position (note action arrow B in FIG. 4a). Next one grasps and pulls up on the lift handles 62 so as to raise the storage cabinet 20 through the intermediate position illustrated in FIG. 2 to the fully deployed position illustrated in FIG. 1. As should be appreciated, as this is done, the two struts 50, 52 of the lift mechanism 48 bias the storage cabinet upwardly so as to make this displacement relatively easy and convenient. Once the storage cabinet 20 is fully deployed, the lock mechanism 46 is reengaged to secure the storage cabinet in the deployed position.

Numerous benefits are provided by the deployable storage system 10. The deployable storage system 10 is very easy to use and provides a convenient and effective place for an individual to organize tools and other objects that need to be carried in the pickup truck 12 without cluttering up the truck cab 18 or interfering with the storage capacity and useful storage area of the truck bed 16.

In the illustrated embodiment, the storage cabinet 20 is provided in the truck bed wall 14 between the truck bed 16 and the cab 18. Here it should be appreciated that one or more storage cabinets 20 of the type described above may be provided in either or both sidewalls of the truck bed as desired.

When the storage cabinet 20 is lowered and seats in the stowed position illustrated in FIG. 3, it should be appreciated that the top wall 34 of the storage cabinet may be flush with the top of the truck bed wall 14. Further, it should be appreciated that a weatherproof seal may be provided to ensure that dirt, debris and moisture does not enter the cavity 22 in the truck bed wall 14 which holds the storage cabinet 20 when the storage cabinet is in the fully sealed and stowed position.

For added security, it should be appreciated that the access door lock 44 and/or the cabinet lock mechanism 64 may comprise a key lock or a coded electronic lock.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A deployable storage system for a truck, comprising: a truck bed wall including a cavity; and
a storage cabinet integrated into said truck bed wall, said storage cabinet configured to be displaceable between a stowed position held within said cavity of said truck bed wall and a deployed position extending above said truck bed wall.

2. The deployable storage system of claim 1, further including at least one lift handle carried on a top wall of said storage cabinet.

3. The deployable storage system of claim 2, wherein said at least one lift handle is connected to a lock mechanism to secure said storage cabinet in said stowed position.

4. The deployable storage system of claim 3, wherein said lift handle is configured to be rotatable between a locked position and an unlocked position.

5. The deployable storage system of claim 4, wherein said storage cabinet includes at least one access door.

6. The deployable storage system of claim 5, further including an access door lock to secure said at least one access door in a closed position.

7. The deployable storage system of claim 6, wherein said access door lock is recessed into said access door.

8. The deployable storage system of claim 7, further including a lock to secure said storage cabinet in said deployed position.

9. The deployable storage system of claim 8, further including a lift mechanism biasing said storage cabinet toward said deployed position.

10. The deployable storage system of claim 9, wherein said lift mechanism includes a first strut and a second strut.

11. The deployable storage system of claim 10, wherein said storage cabinet includes a first end wall and a second end wall.

12. The deployable storage system of claim 11, wherein said first end wall includes a first channel receiving said first strut and said second end wall includes a second channel receiving said second strut.

13. The deployable storage system of claim 12, wherein said first strut and said second strut are both gas struts.

14. The deployable storage system of claim 1, wherein said storage cabinet includes at least one access door.

15. The deployable storage system of claim 14, further including an access door lock to secure said at least one access door in a closed position.

16. The deployable storage system of claim 15, wherein said access door lock is recessed into said access door.

17. The deployable storage system of claim 1, further including a lock to secure said storage cabinet in said deployed position.

18. The deployable storage system of claim 1, further including a lift mechanism biasing said storage cabinet toward said deployed position.

* * * * *